United States Patent
Dean

(10) Patent No.: US 8,300,510 B1
(45) Date of Patent: Oct. 30, 2012

(54) LASER DIODE WRITE DRIVER

(75) Inventor: Douglas Warren Dean, Eagan, MN (US)

(73) Assignee: Texas Instruments Incorporated, Dallas, TX (US)

( * ) Notice: Subject to any disclaimer, the term of this patent is extended or adjusted under 35 U.S.C. 154(b) by 34 days.

(21) Appl. No.: 13/098,100

(22) Filed: Apr. 29, 2011

(51) Int. Cl.
*G11B 11/00* (2006.01)

(52) U.S. Cl. .................................. 369/53.26; 369/116

(58) Field of Classification Search .................. None
See application file for complete search history.

(56) References Cited

U.S. PATENT DOCUMENTS 7,764,122 B1 * 7/2010 Dasgupta ..................... 330/255

2009/0073827 A1 * 3/2009 Hsieh et al. ................... 369/47.5

* cited by examiner

*Primary Examiner* — Paul Huber

(74) *Attorney, Agent, or Firm* — Lawrence J. Bassuk; W. James Brady; Frederick J. Telecky, Jr.

(57) ABSTRACT

A laser diode write driver is described. This laser diode write driver comprises: a feedback loop coupled for receiving an input current signal, the feedback loop operative for reaching a steady state and comprising a Class AB driver in series with a Class A driver, wherein the feedback loop transmits a first current signal; a current mirror adapted to receive the first current signal, the current mirror operative for replicating the first current signal and transmitting a second current signal; a differential device adapted to receive the second current signal, the differential device operative for steering current in at least one direction and transmitting a first voltage signal; a second class AB driver adapted to receive the first voltage signal and transmit a first drive signal, a second Class A driver adapted to receive the first drive signal and transmit a second drive signal; and an output device coupled to the second drive signal and operative for transmitting a driver output signal that drives the light source in response to receiving the second drive signal.

12 Claims, 13 Drawing Sheets

LASER DIODE WRITE DRIVER

CROSS REFERENCE TO RELATED APPLICATION(S)

The present application claims priority to jointly owned U.S. Provisional Application corresponding to application No. 61/186,298 entitled "Laser Diode Drive with Wave Shape Control." The present application also claims priority to jointly owned U.S. Patent Application corresponding to application Ser. No. 12/758,160 entitled "Laser Diode Drive with Wave Shape Control."

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. When these drives include light sources, signals sent to these sources should be properly processed so these sources emit the appropriate light for reading and writing data optically.

BRIEF DESCRIPTION OF THE DRAWINGS

The laser diode write driver may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1A:
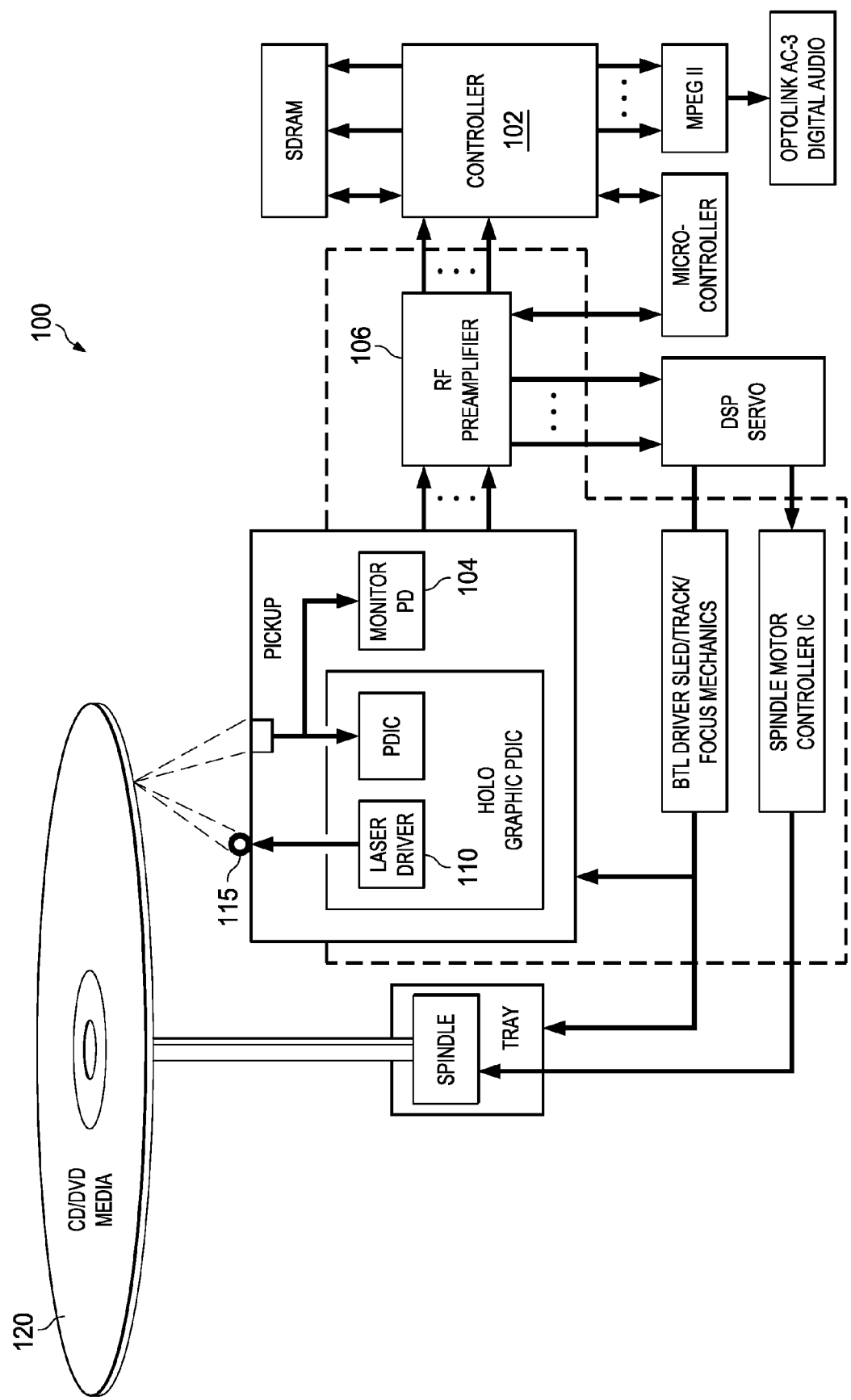
FIG. 1A is a system drawing illustrating components within an optical disk drive.

While the laser diode write driver is susceptible to various modifications and alternative forms, specific embodiments have been shown by way of example in the drawings and subsequently are described in detail. It should be understood, however, that the description herein of specific embodiments is not intended to limit the laser diode write driver to the particular forms disclosed. In contrast, the intention is to cover all modifications, equivalents, and alternatives falling within the spirit and scope of the laser diode write driver as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1A, is a system drawing illustrating components within an optical disk drive 100. A controller 102 monitors the output light power level of a laser diode 115 using a Monitor PD 104, or monitor photodiode, and an RF, or radio frequency, preamplifier 106. This controller can keep an expected power level by changing an input control current of a laser driver 110 through an APC, or auto power controlling, feedback loop, even if a light source 115 such as a laser diode changes output power due to various conditions, such as temperature changes, etc.

Also, the controller 102 sets the enable signal for switching some current channels of the laser driver 110, which arranges a data writing pulse. In the case of data reading, the controller 102 may only set a DC current by disabling the switching channels and applying the designated current. In the case of data writing, the controller 102 applies some adjustment signals, or enable-switching signals, to arrange the writing pulse waveform as a combination of switching current pulses. The power level can be changed as each switching channel has its own designated current. The controller 102 can arrange these designated currents based on the Monitor PD 104 output with some detecting function in the RF preamplifier 106. At the very least, this controller has two power control levels, one for the read power and one for the write power.

As illustrated in this figure, the laser driver 110 sends a signal that prompts an associated light source 115 (e.g., laser diode) to emit light. The light source 115 may emit light at any of a number of wavelengths (e.g., 400 nm, 650 nm, 780 nm). Light from this source contacts an associated optical media 120, such as a compact disc (CD), blue ray device (Blu-ray), or digital versatile disk (DVD). Light contacting the optical media 120 can either facilitate data storage or data retrieval from the optical media 120.

Figure 1B:
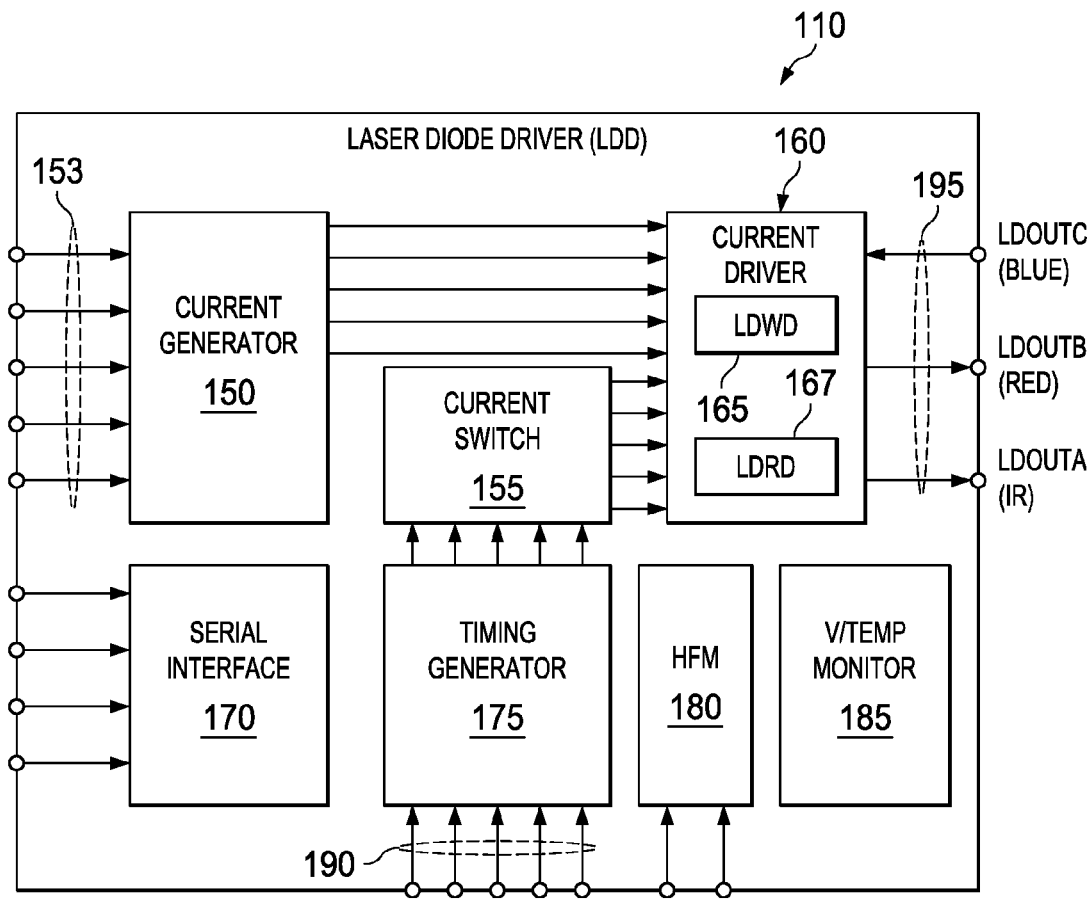
FIG. 1B is a block diagram illustrating an enlarged view of the innovative laser diode driver of FIG. 1A.

FIG. 1B is an enlarged view of the innovative laser driver 110, which may be a laser diode driver (LDD). The LDD 110 is an integrated, fully programmable, multi-function product that controls and drives laser diodes (e.g., light source 115) within optical drives as described with reference to FIG. 1A. More specifically, the LDD 110 can apply the current for reading, writing, and erasing removable high capacity disks (e.g., capacities greater than approximately 50 Gbytes/disk). The LDD 110 also has low noise (e.g., noise of approximately 0.5 nA/rt-Hz), high speed (e.g., 800 Mb/s) and high current (e.g., approximately 1 amp). Any numbers included in this application are for illustrative purposes only and numerous alternative implementations may result from selecting different quantitative values.

At a high level, the LDD 110 may include a current generator 150. Generally, the current generator 150 receives some input signals 153 associated with several input channels, which have an associated input current. The current generator 150 works in tandem with current driver 160 and scales the input currents by some gain factors. The current at the output 195 is typically a summation of these scaled input currents from the individual channels. Thus, the current generator 150 and current driver 160 control the amount of current for each output 195. Besides receiving current signals from the current generator 150, the current driver 160 also receives signals from the current switch 155. The current switch 155 and the timing generator 175, via the serial interface, control which of the channels should be turned on or turned off. The timing generator 175 receives various channel enable inputs 190. Though there are five channel enable inputs that are shown in FIG. 1B, the LDD 110 may have any number of channel enable inputs, such as two, six, or the like. The timing generator 175 determines from the channel enable inputs 190 and serial interface control, whether a given input channel will be either turned on or turned off and transmits corresponding signals to the current switch. The current switch 155 processes these signals and then transmits signals to the current driver 160 designating which channels are active. The current driver 160 is the last current gain stage and drives the laser diodes directly. In other words, the output signals from the current driver 160 also serve as output signals for the LDD 110, which are used in driving the laser diode, or the light source 115 (see FIG. 1A).

In addition to the above-mentioned devices, the LDD 110 includes additional components. A serial interface (I/F) 170 has several inputs (e.g., serial data enable, serial data, serial clock) that may be used for programming the gain, enabling channels, and turning on the LDD. The LDD 110 also includes a high frequency modulator (HFM) 180 and voltage/temperature monitor (V/Temp Monitor) 185. The HFM 180 modulates the output current for reducing mode-hopping noise of the laser diodes. The voltage/temperature monitor 185 monitors the laser diode voltage drop and on-chip temperature. One skilled in the art will appreciate that numerous alternative implementations may result from removing any or several of the blocks within the LDD 110.

Though not illustrated, an integrated circuit for the LDD 110 generally has four switching, or write channels and one static, or read channel for each output. Each driver can be programmed independently from several milliamps to hundreds of milliamps. The current driver 160 includes a Laser Diode Write Driver (LDWD) 165 for each output that allows each switching channel to be programmed independently and has very fast switching times, low power, and good accuracy. The current driver 160 also includes a Laser Diode Read Driver (LDRD) 167 which produces a static current. The final output current is a summation of each individual switching channel from the LDWD and the static channel from the LDRD. The combination of the output currents from these channels are used to write data to the media Either the LDWD 165 or the LDRD 167 can optionally include wave-shape control circuitry. With this circuitry, each channel's wave-shape can be independently controlled which includes overshoot, rise-time, and fall-time as further explained below. Altering the wave-shape can improve the effectiveness in writing data to the optical media 120 (see FIG. 1A) in the case of the LDWD 165.

Figure 2A:
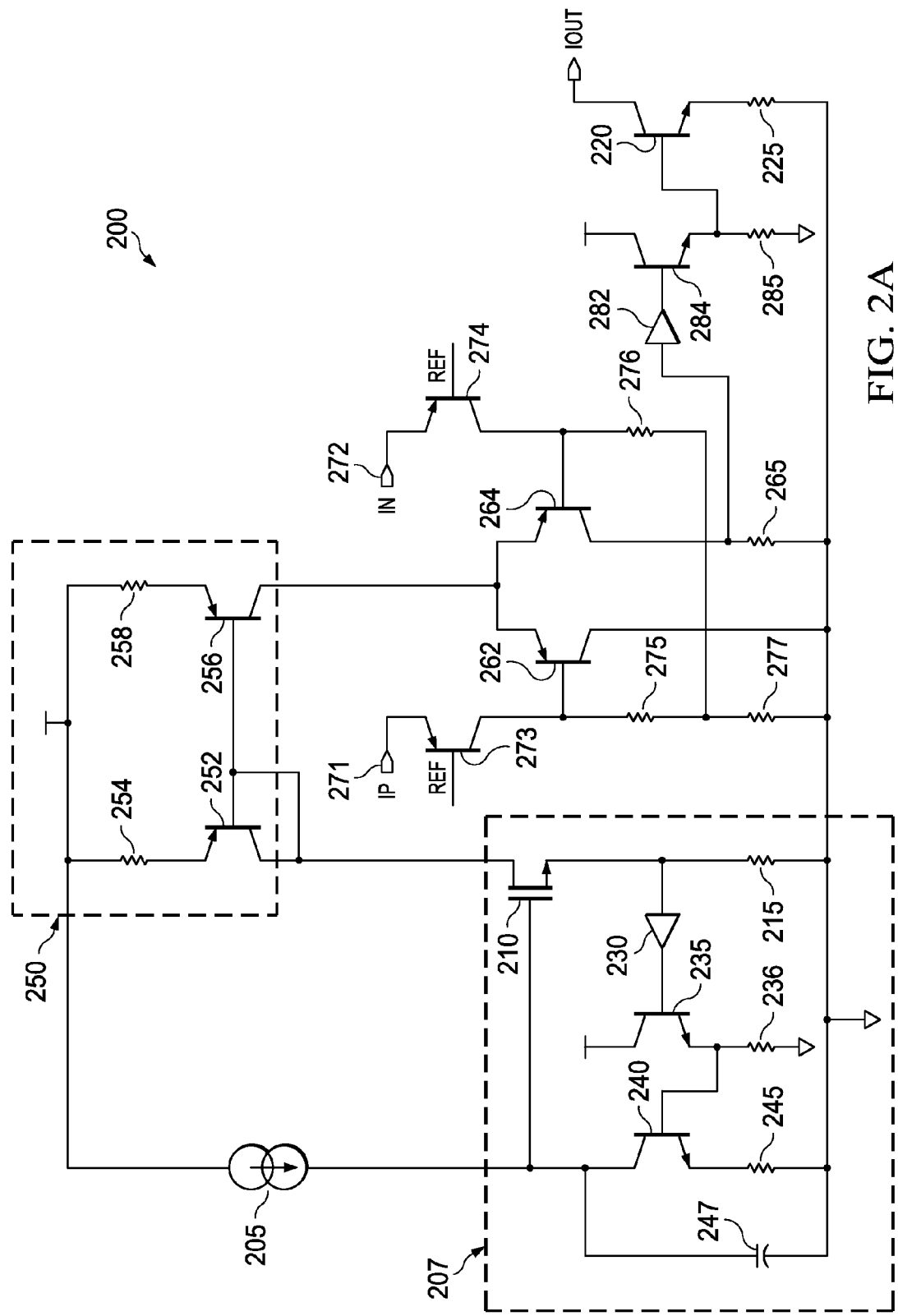
FIG. 2A is a circuit diagram illustrating a first implementation of the laser diode write driver of FIG. 1B.

FIG. 2A is one implementation of the LDWD 165 that shows a simplified circuit diagram 200 of a single channel driver. Though optionally shown as a single channel driver, other implementations of the LDWD 165 may include 2, 3, 5, or some other suitable number of channels. Each channel may be programmed independently, meaning the input current into each channel may be different. The total output current is the summation of each channel's output current if more than one channel is used. A current source 205 represents an input current, $I_{input}$, which is a scaled version of an output current, $I_{out}$ based on a gain factor, K. As a result, the input current $I_{input}=I_{out}/K$. As mentioned above, this input current may result from output current signals emitted from the current generator 150 as shown in FIG. 1B.

The circuit diagram 200 includes several components that form a feedback loop 207. The feedback loop 207 includes a transistor 210 that is shown as an n-type metal oxide semiconductor (MOS) transistor. Though shown as a MOS transistor, an alternative implementation may result from using other transistor types such as a bipolar transistor. The size and other characteristics of the transistor 210 determine the current range over which the loop will function properly, the amount of headroom for the input current source 205 and current mirror 250, and the accuracy of the loop. The feedback loop 207 also includes a resistor 215 coupled to a low voltage supply, or ground. The feedback loop 207 also includes an AB driver 230. This AB driver can be characterized by unity gain with a very high input impedance and a very low output impedance. The output of the AB driver 230 connects to a base of a transistor 235, which is in series with a resistor 236. The emitter of the transistor 235 is connected to the base of a transistor 240, which is connected in series with a resistor 245. The size and other characteristics of the transistor 240 may be scaled to an output transistor 220, such that this output transistor is K times larger than the transistor 240 where K is a gain factor. The resistor 245 may also be scaled to the output resistor 225, such that its resistance may be the product of the resistance of the output resistor 225 and the gain factor, K. The transistor 235 and resistor 236 may also be scaled versions of transistor 284 and resistor 285. Finally, the feedback loop 207 may also include a capacitor 247 that sets a dominant pole within this loop for stability. The transistors, or switching devices, described in this document may be any type of transistor such as a bipolar junction transistor, field effect transistor, or the like.

The transistor 210 and the feed back loop 207 work in concert. As an input current $I_{input}$ enters this loop, the gate of the transistor 210 will be driven high until this transistor starts conducting current through the resistor 215, which is tied to the low supply voltage or ground. A voltage develops across the resistor 215, which enters the AB driver 230. The output voltage from AB driver 230 drives the base of transistor 235; the resulting output voltage from the emitter of transistor 235 correspondingly drives the base of the transistor 240. The voltage at the base of the transistor 240 increases and it starts conducting. The feedback loop 207 eventually settles at a point where all of the input current, or $I_{out}/K$, conducts through transistor 240 and the resistor 245 to the ground.

As this feedback loop 207 reaches steady state, a voltage develops across the resistor 215 that is equivalent to the voltage at the base of the transistor 240. The voltage across resistor 215 and at the base of transistor 240 are equivalent because the AB driver 230 is configured in such a way that the input voltage is level shifted to offset the voltage drop of the transistor 235. This in turn roughly cancels the base-emitter voltage drop of transistor 235. This voltage is equal to the input current times the resistance value of 245 plus the base-emitter voltage of 240. At that voltage transistor 240 will conduct essentially all of the input current. The current through resistor 215 (developed by the voltage across the resistor 215) goes through the transistor 210 into a current mirror 250. This current mirror includes a transistor 252, resistor 254, transistor 256, and a resistor 258. For this current mirror, the current in transistor 252 gets replicated into the transistor 256.

Figure 2B:
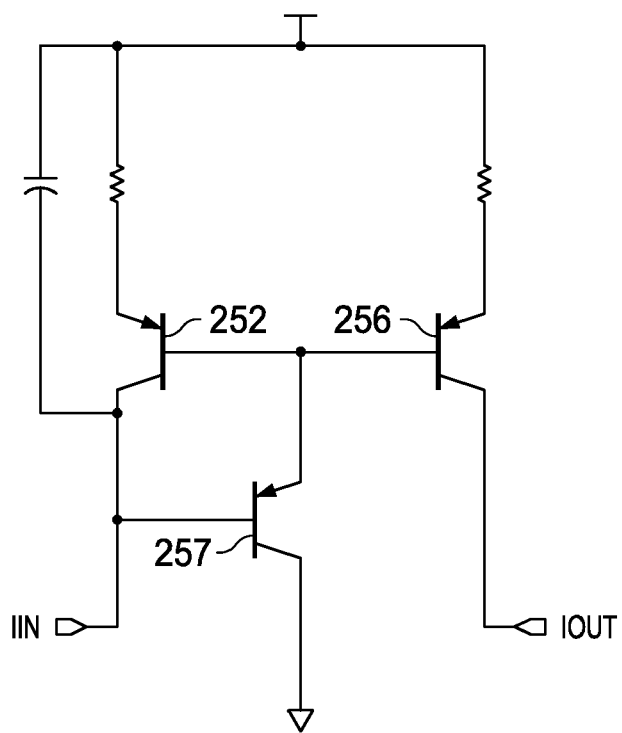
FIG. 2B is a circuit diagram of a current mirror with a beta-helper.
Figure 2C:
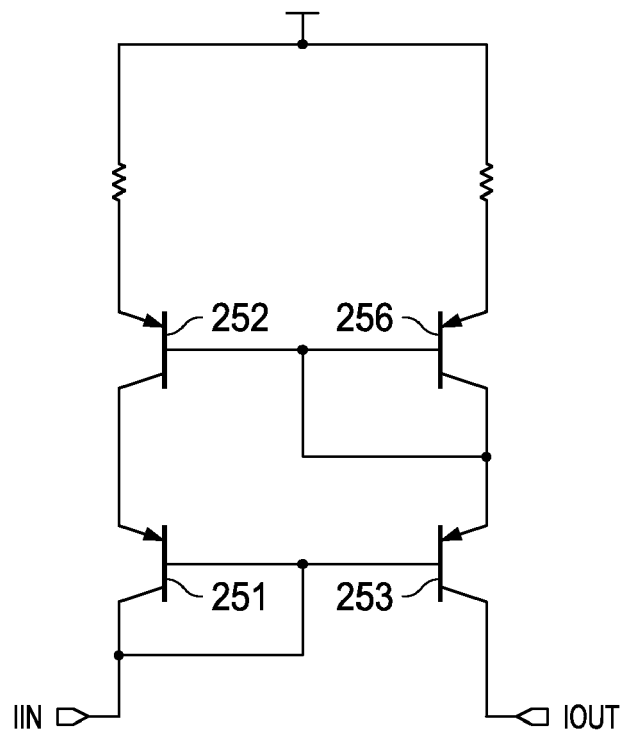
FIG. 2C is a circuit diagram of a Wilson current mirror.

An alternative implementation may include more complex current mirrors with greater accuracy. For example, one alternative implementation may include a beta-helper, or accuracy enhancing device, that helps reduce base current losses associated with the transistor 252 and the transistor 256 as shown in FIG. 2B. In this implementation, the transistor 257 serves as the accuracy enhancing device. The beta-helper current mirror implementation may be configured for unity gain or a higher gain that reduces the power. FIG. 2C illustrates another alternative implementation which is a Wilson current mirror that includes two more transistors 251, 253 in a current mirror arrangement. Using a Wilson current mirror compensates for base current losses and also increases the output impedance.

The output current from the current mirror 250 enters a differential pair. The differential pair includes the transistors 262 and 264. The voltages on the bases of these transistors determine which way the current is steered. In other words, the base voltages determine whether current goes through the transistor 262 to the ground or whether the current goes through the transistor 264 and then the resistor 265 to ground. If the current goes through transistor 264, it develops a voltage across the resistor 265. In one implementation, the resistance of this resistor may have the same value as the resistor 215. The voltage across the resistor 265 will be the same as the voltage across the resistor 215 because the current through the resistor 215 is mirrored to be the same through the resistor 265. In another implementation, scaling the current from the current mirror 250 by a factor M and scaling the resistors such that 215 is NI times larger than 265 can also produce a voltage that is the same across these resistors while reducing power.

The circuit diagram 200 includes two current-mode ports 271, 272 that either steers current into the resistor 265 or into ground. From the current port 271, the devices that connect between this port and the ground are as follows: transistor 273, resistor 275, and resistor 277. From the current port 272, the devices that connect between this port and the ground are as follows: transistor 274 and resistor 276, and resistor 277. With device 273 and device 274 set at a reference voltage, a voltage develops across an associated resistor depending on whether port 271 of 272 is receiving current. For example, when current flows through the transistor 274, a voltage may develop across the resistor 276 and resistor 277. Similarly, when current flows through the transistor 273, a voltage may develop across the resistor 275 and resistor 277. As the current switches between these transistors, the resistor 277 sets a common-mode voltage because it always has current in it as the current is switched from port 271 to port 272 and back again. If device 273 is conducting current, resistor 275 develops a voltage across it and the resistor 276 does not have a voltage across it so it will be at the common-mode voltage; this means that the base of device 264 is lower than the base of device 262 and the current conducts through device 264 into the resistor 265. The opposite is true when the current is switched. The voltage across 275 or 276 is set such that the differential pair 262 and 264 switches completely. The common-mode voltage is set such that the device 264 does not saturate when conducting current.

The voltage that develops across resistor 265 goes into a second AB driver 282 that is K times larger than the AB driver 230; one skilled in the art will appreciate that each AB driver may optionally be called a buffer. The characteristics of this AB driver are the same as AB driver 230 which includes unity gain, high input impedance and low output impedance. The AB driver 282 will drive the base of transistor 284 (Class A driver), which in turn will drive the base of the transistor 220. Because AB driver 282, transistor 284, and resistor 285 are scaled versions of AB driver 230, transistor 235, and resistor 236, they will set a voltage on the base of the output device 220 that is essentially the same as the voltage at the base of the device 240. Because output device 220 is K times larger than input device 240, the current through the output device 220 will be K times larger; the output current $I_{out}$, or driver output signal, is now a scaled version of the input current $I_{input}$ or input current signal. The output current accuracy largely depends on this gain factor K, which determines the ratio of device sizes that need to be matched. Other inaccuracies such as base-currents losses can typically be corrected with additional circuitry.

This output current $I_{out}$ conducts through an external laser diode (e.g. a laser diode that is associated with the light source 115), with its cathode receiving the output current $I_{out}$, the corresponding anode for this laser diode will connect to another voltage supply. This output current $I_{out}$ will conduct when the resistor 265 is set to the same voltage as the resistor 215. When the current-mode inputs 271, 272 are switched such that the device 262 conducts, the voltage across the device 265 will return to ground and the output driver 220 will shut off. This write driver can be switched very quickly due to the current-mode inputs 271, 272 and the differential pair that includes device 262 and device 264. The value of the resistor 265 can be chosen so the voltage quickly decays to ground when the current switches. The AB driver 282, can be designed such that the voltage drop across the device 265 is minimized. The voltage drop consists of a diode and a small IR resulting in faster rise and fall times. The voltage at the base of the output device 220, which is set by the voltage drop across resistor 265 and the design of the AB driver 282 along with transistor 284 and resistor 285, determines whether the output device is conducting or not conducting (on or off).

Figure 2D:
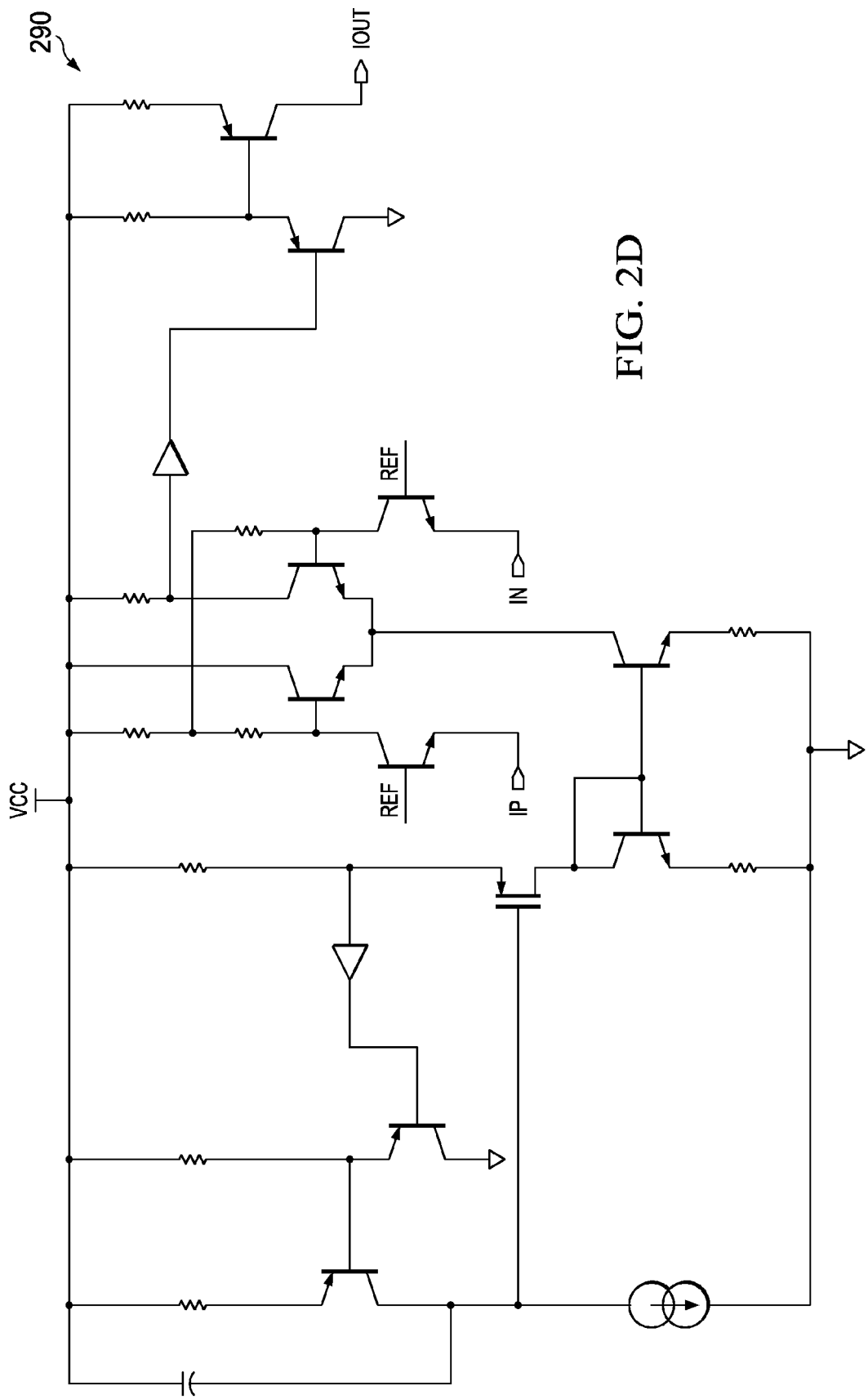
FIG. 2D is a circuit diagram illustrating a second implementation of the laser diode write driver of FIG. 1B.

FIG. 2D is a second implementation of the LDWD 165 illustrating a circuit 290 that has its anode connected to $I_{OUT}$ and its cathode connected to ground. Like the circuit 200, this circuit can drive a light source 115, such as a laser diode. One skilled in the art will appreciate that the circuit, though connected differently (essentially "flipped"), operates similar to the circuit 200.

Figure 3A:
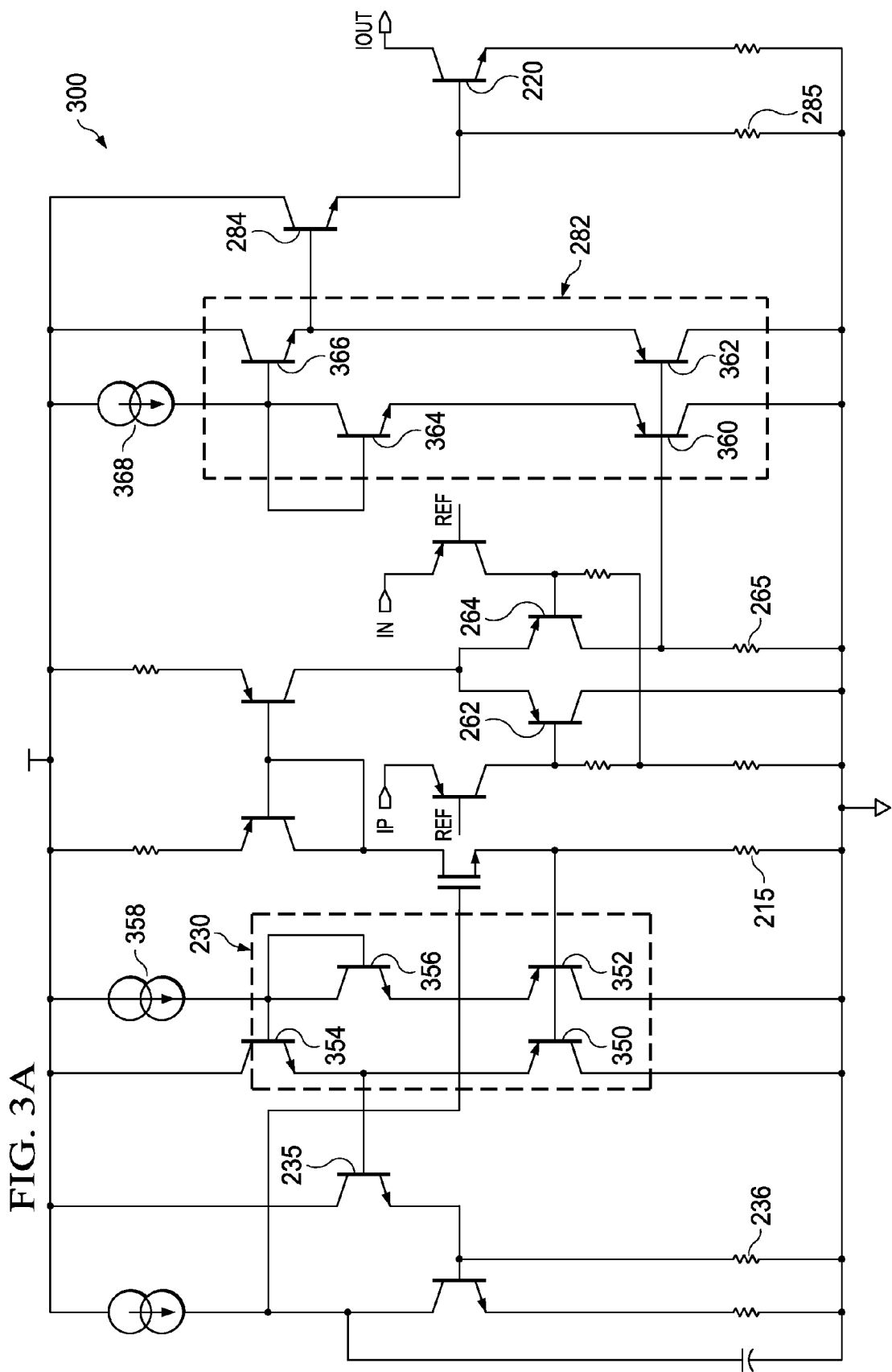
FIGS. 3A-3B are circuit diagrams illustrating implementations of the AB drivers of FIGS. 2A and 2D.
Figure 3B:
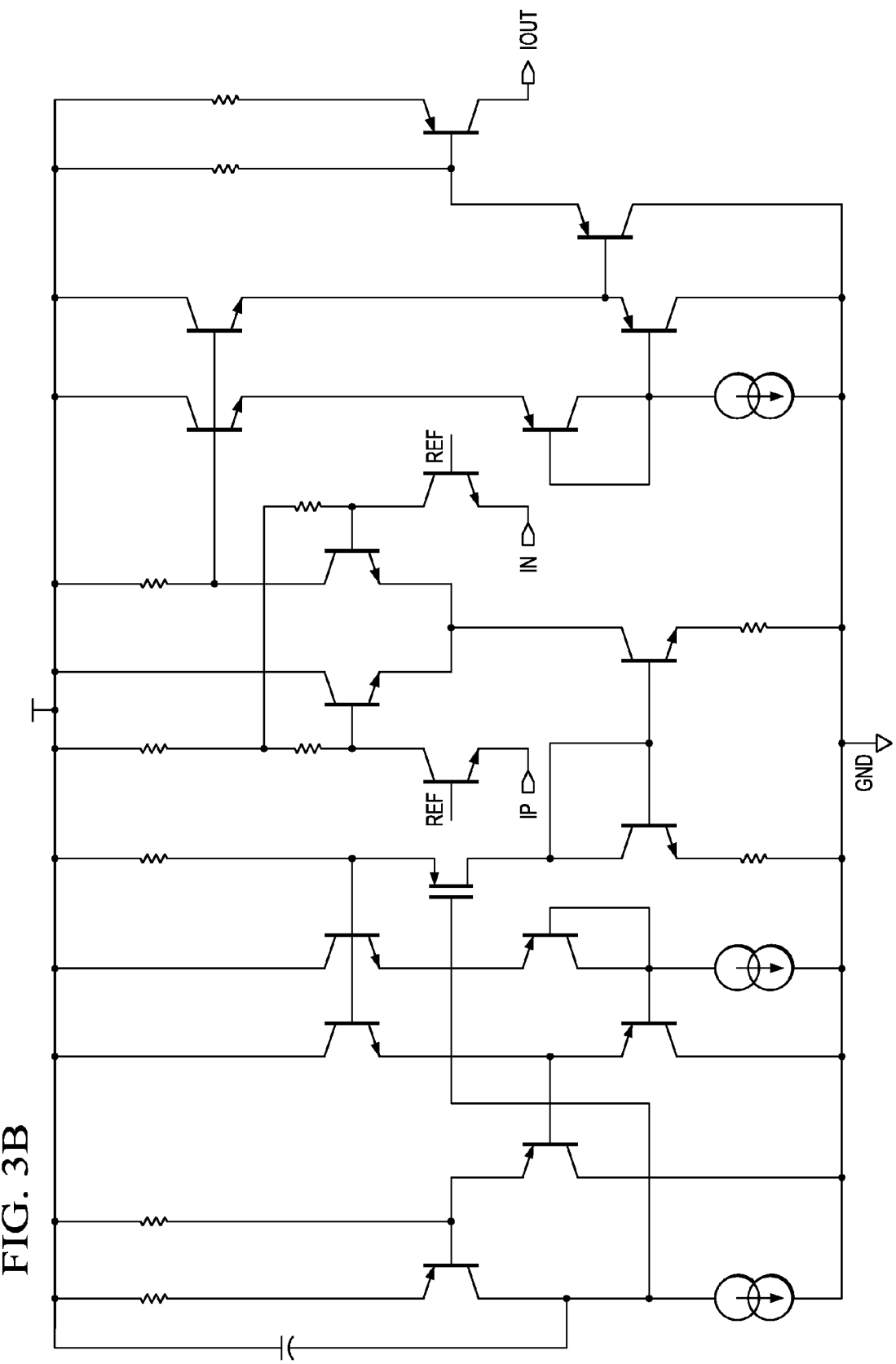

FIG. 3A is a circuit diagram 300 that shows one implementation of the AB drivers shown in FIG. 2A. Like FIG. 2D, FIG. 3B is a "flipped" version of FIG. 3A, which operates like FIG. 3A. Returning to this figure, AB driver 230 may include four transistors 350-356 biased by current source 358; together these transistors receive an input voltage at device 352 base (which is the voltage across resistor 215) that is level shifted to offset the voltage drop across device 235. Similarly, the AB driver 282 also includes four transistors 360-366 and a bias current source 368. Device 360 receives an input voltage and that voltage is level shifted and output at device 362 emitter. The transistors 360-366 and current source 368 may be scaled versions that are K times larger that the transistors 350-356 and current source 358.

Using components within the circuit 300, designers can make selections that improve the power and the speed of the LDWD 165. Optimizing some current sources (e.g., current source 358, current source 368) or resistors (e.g., resistor 285, resistor 236) within the circuit 300 can dramatically improve the power or the speed. For example, increasing bias current 368 will make the AB driver 282 have a lower output impedance so it can drive the transistor 284 faster, but this increases power. Resistor 285 can also be decreased which will increase power, but transistor 284 will be able to drive the output device faster. By decreasing resistor 285, the transistor 220 will also shut off faster due to its lower impedance, providing a more symmetric waveform. Decreasing the current in the AB driver and transistor 284 will typically slow down the switching of the output device. The current in the AB driver and transistor 284, which is determined by resistor 285 can each be set independently allowing for a power speed trade-off. The AB drivers 230 and 282 are configured such that the input voltage into the AB driver 230 gets level shifted to offset the voltage drop of the transistor 235; thus the voltage drop across the resistor 215 is essentially equal to a diode, and a product of the current and the resistance. This is the same for AB driver 282. This impacts the speed and performance of this LDWD 165 because the voltage drop that is across resistor 215 and also across the resistor 265 is minimized and there is always parasitic capacitances associated with interconnect, etc and so the lower the voltage swing typically the faster the switching. In addition, the gain factor K can also be chosen for accuracy, speed, and power optimization. Some potential values for this gain factor may be 20, 40, or the like.

Figure 4A:
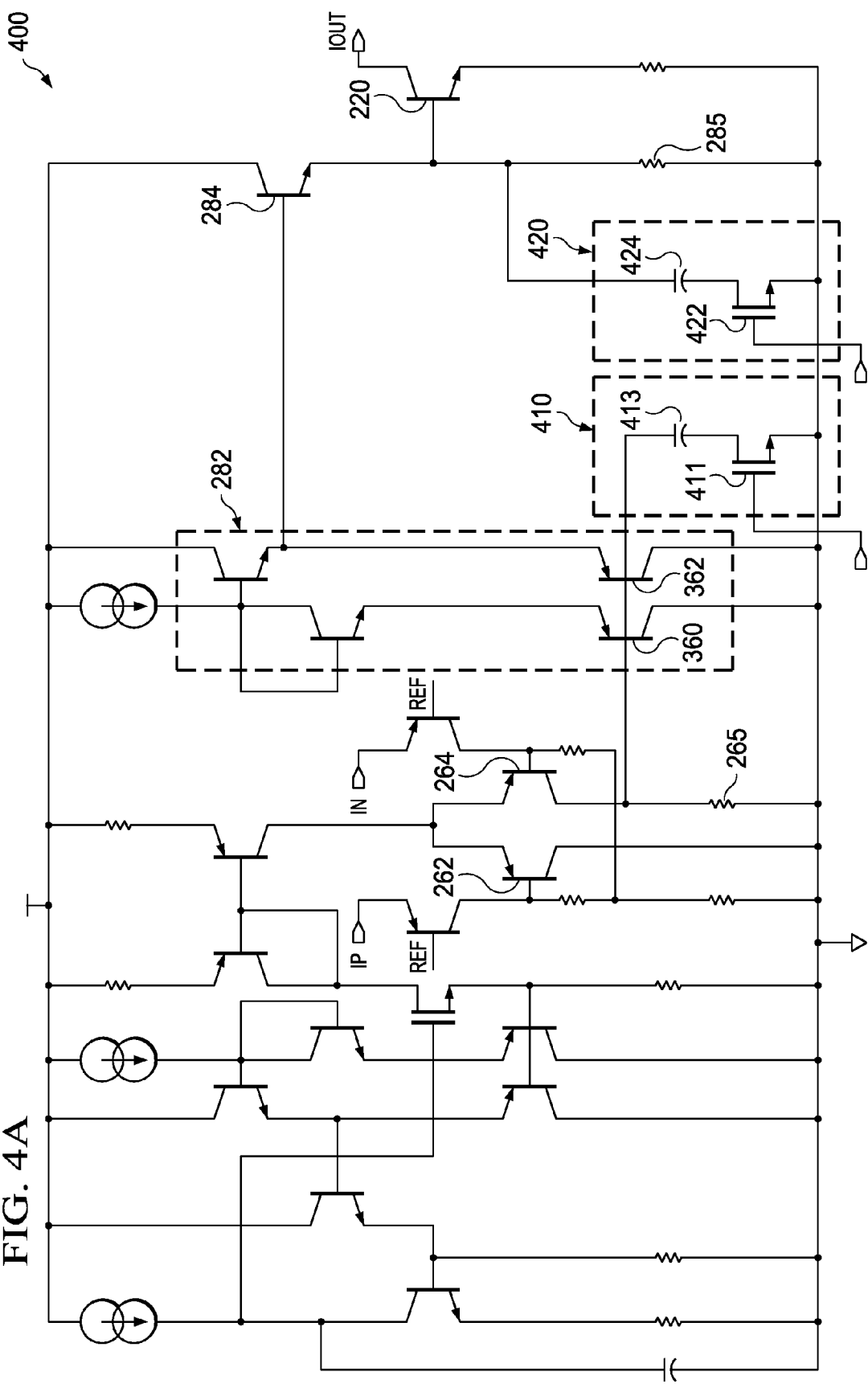
FIGS. 4A-4B are circuit diagrams illustrating a laser diode write driver with wave shape control of FIG. 2A for altering rise time and fall time.

The LDWD 165 may also include wave shape control, which may change the rise-time, fall-time, or overshoot of the output current waveform. FIG. 4A is a circuit diagram 400 for the LDWD 165 with wave shape control. Though similar to the circuit diagram 300 and similar devices are numbered the same, the circuit diagram 400 impacts wave shape control by including two devices. More specifically, this circuit diagram includes a rise-time variation device 410, which includes a switch, or transistor, 411 and a capacitor 413 connected to the bases of the transistor 360 and the transistor 362. As current travels through the transistor 264 to the resistor 265, the AB driver 282 tracks the voltage across 265. The voltage on the resistor 265 develops quickly because of low capacitive loading on this node. This creates a fast rise-time that transfers through the AB driver 282 and the transistor 284 to the output transistor 220. When the gate of the transistor 411 is at ground, it is off and there is high impedance between the drain and the source, such that the capacitor 413 has little effect on the resistor 265.

Figure 4B:
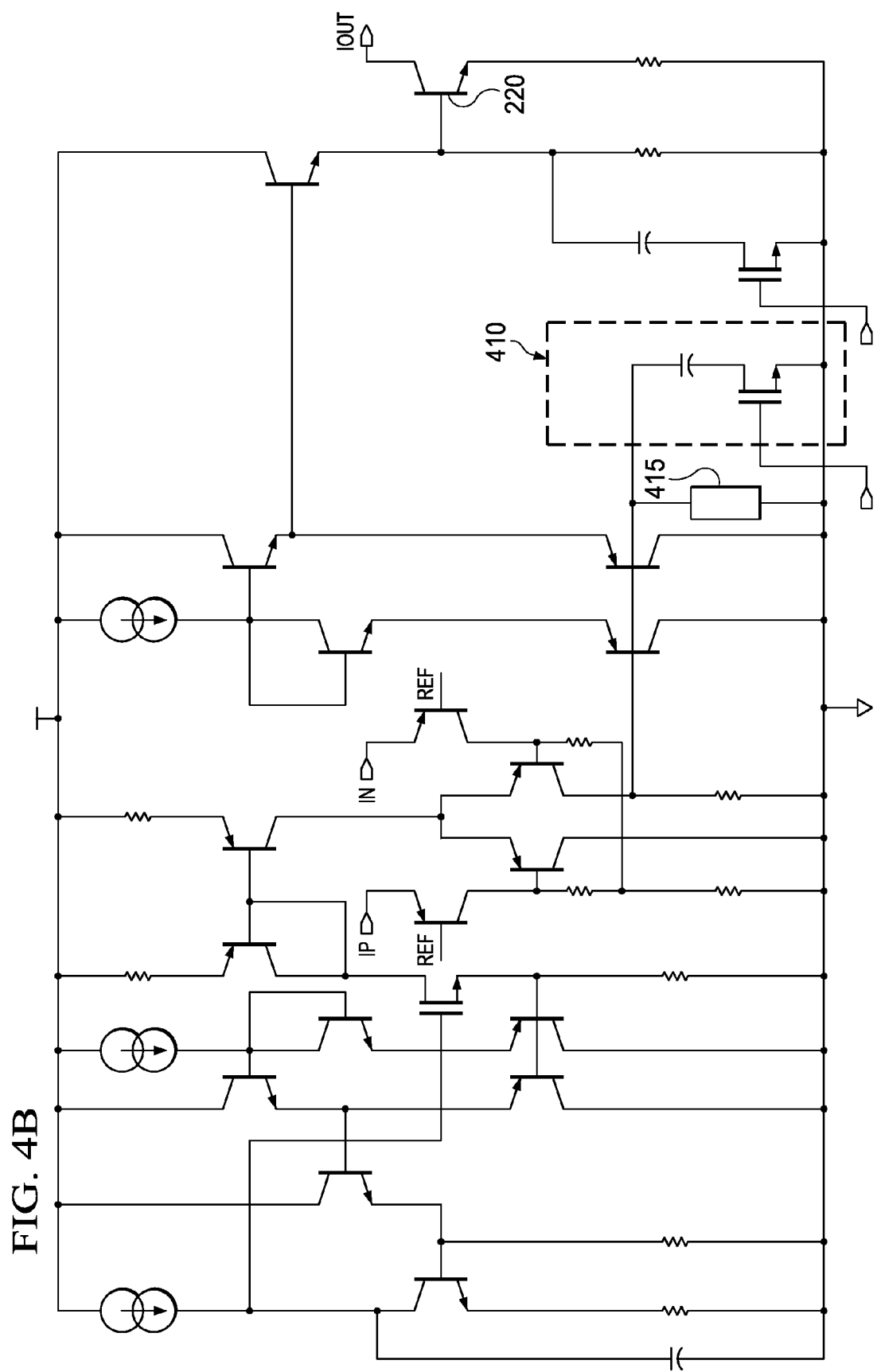

In contrast, changing the gate of transistor 411 to a voltage of approximately VCC turns on this transistor and there is low impedance from drain to source. Now, capacitor 413 is in parallel with the resistor 265. Thus, current from the transistor 264 charges both this capacitor and this resistor, which means that it takes longer for the current from the transistor 264 to reach its steady-state value. The voltage at the base of the output transistor 220 follows the input to the AB driver 282, which is essentially the voltage across the resistor 265. Since this voltage is now slower and the output transistor follows, the output current rise-time is slower. Therefore, including the rise-time variation device 410 can alter the rise-time of an output signal from the circuit diagram 400 for the LDWD 165. In another implementation, selecting certain device characteristics can create a desired output rise time. For example, one may select a certain size for the transistor 411 or a certain capacitance for the capacitor 413. Adding another rise-time variation device 415 in parallel with device 410 can make programmable rise times as shown in FIG. 4B. Though the devices within the rise-time variation device 415 are not shown, they may be either active or passive. In one implementation, they may include a MOS field effect transistor and a capacitor of a different value than the capacitor 411 and the transistor 413. Adding these devices can further slow the rise-time, which may further reduce overshoot and ringing, thus controlling the waveshape.

Figure 5:
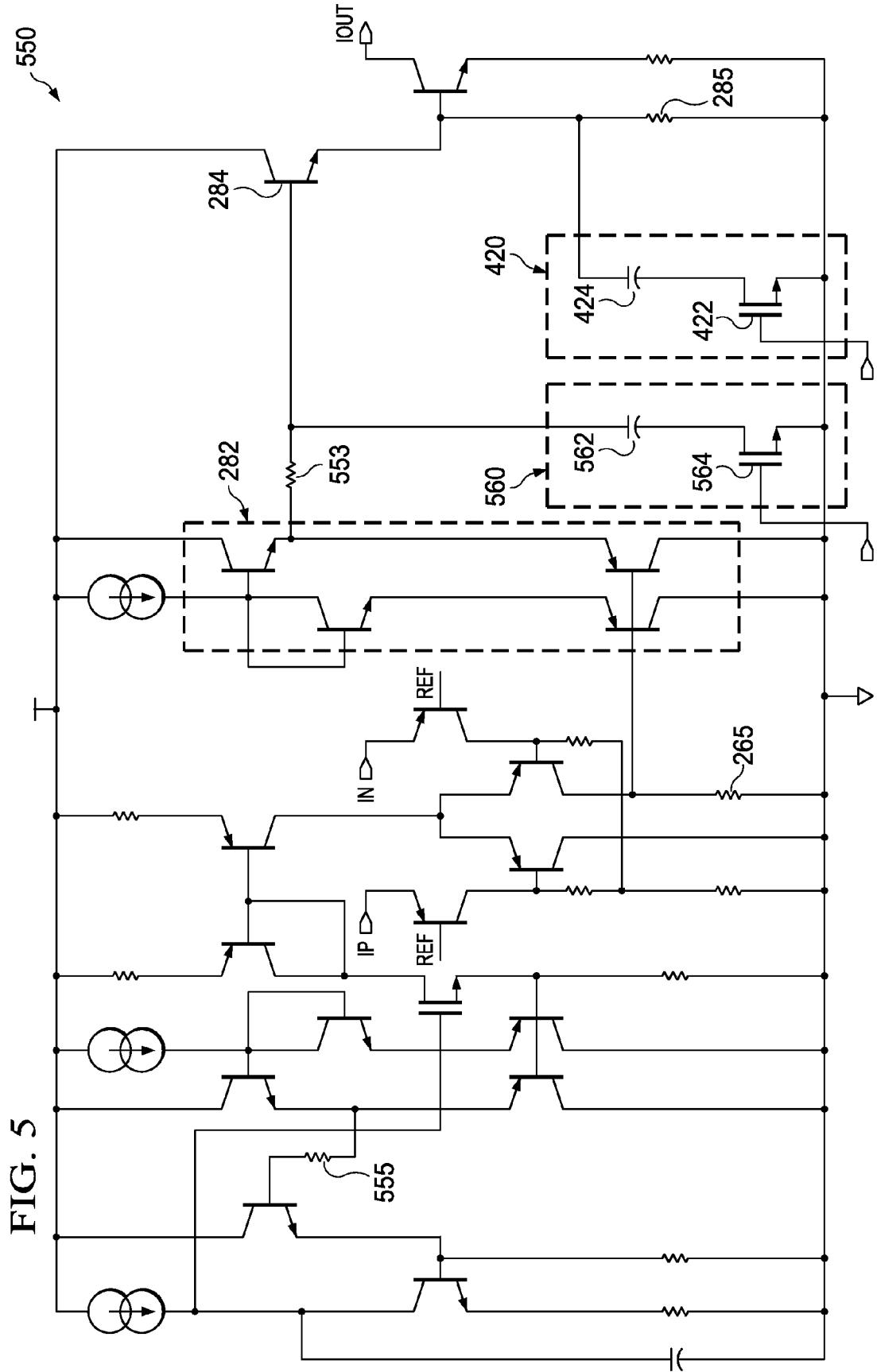
FIG. 5 is a circuit diagram illustrating a third implementation of a laser diode write driver with wave shape control.

FIG. 5 is a circuit diagram 550 of an alternative implementation for the LDWD 165 with wave-shape control circuitry where the rise-time can be controlled. This circuit diagram includes a resistor 553 positioned between the AB driver 282 and the transistor 284. Adding a resistor 555 in the control loop that is K times larger than the resistor 553 can compensate for any voltage drop across the resistor 553. The resistor 553 increases the output impedance of the AB driver 282 and helps isolate it from ringing; this ringing may be associated with either one or both of the voltage supplies due to inductance. The ringing can also be associated with driving a laser diode that has inductance associated with its package. If a rise-time variation device 560 connects to the bases of the transistor 284, the AB driver 282 charges the capacitor 562 through the resistor 553 which also slows down the rise-time of the voltage that drives transistor 284 so long as the gate of the transistor 564 is connected to voltage such that the device is on. When the transistor 564 is turned off, the capacitor 562 has very little effect on the rise-time. As with the other solution described with reference to FIG. 4B, several more devices can be added in parallel to make programmable rise-times by using different values of capacitors.

Returning to FIG. 4A, the circuit diagram 400 also includes a fall-time variation device 420 connected to resistor 285. The rise-time variation device 410, which decreases the rise time, generally does not have a large effect on the fall-time. The reason is because the resistor 285 is the most impactful on the fall-time. When the input transistor 284 decreases, the resistor 285 pulls the base of the transistor 220 down until the transistor is off. When there is little capacitance on the base of the transistor 220, then the resistor 285 can quickly pull this base to a low supply voltage or ground. If there is capacitance on that node, then it takes longer to pull the node to ground and the transistor 220 takes longer to shut off. The fall-time variation device 420 may include a switch, or transistor 422, and a capacitor 424. The transistor 422 is a switch that is on or off and either adds the capacitor 424 to the circuit or acts as a high impedance that has little effect on the circuit. As described with reference to FIG. 4B, several more devices (e.g., mosfets and capacitors) can be added in parallel to accommodate different fall-times. The fall-time variation device 420 has little effect on the rise-time because when the AB driver is pulled high, the transistor 284 provides the current to pull-up on the base of the output transistor.

Figure 6B:
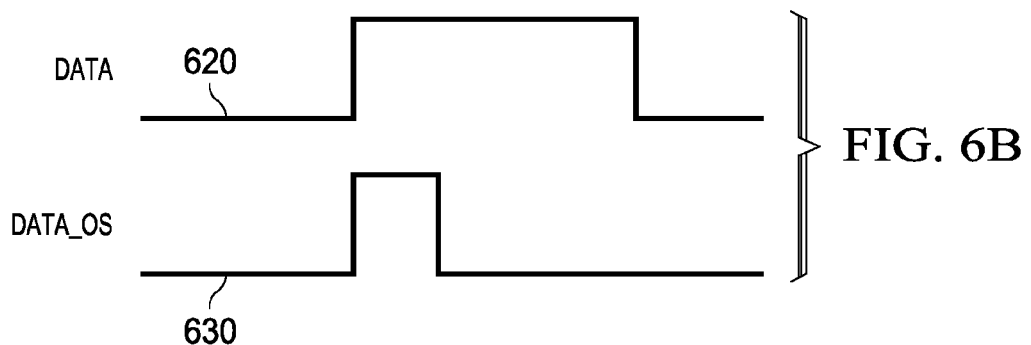
FIG. 6B is a comparative graph of the voltage for a data signal and the voltage for an overshoot signal.
Figure 6A:
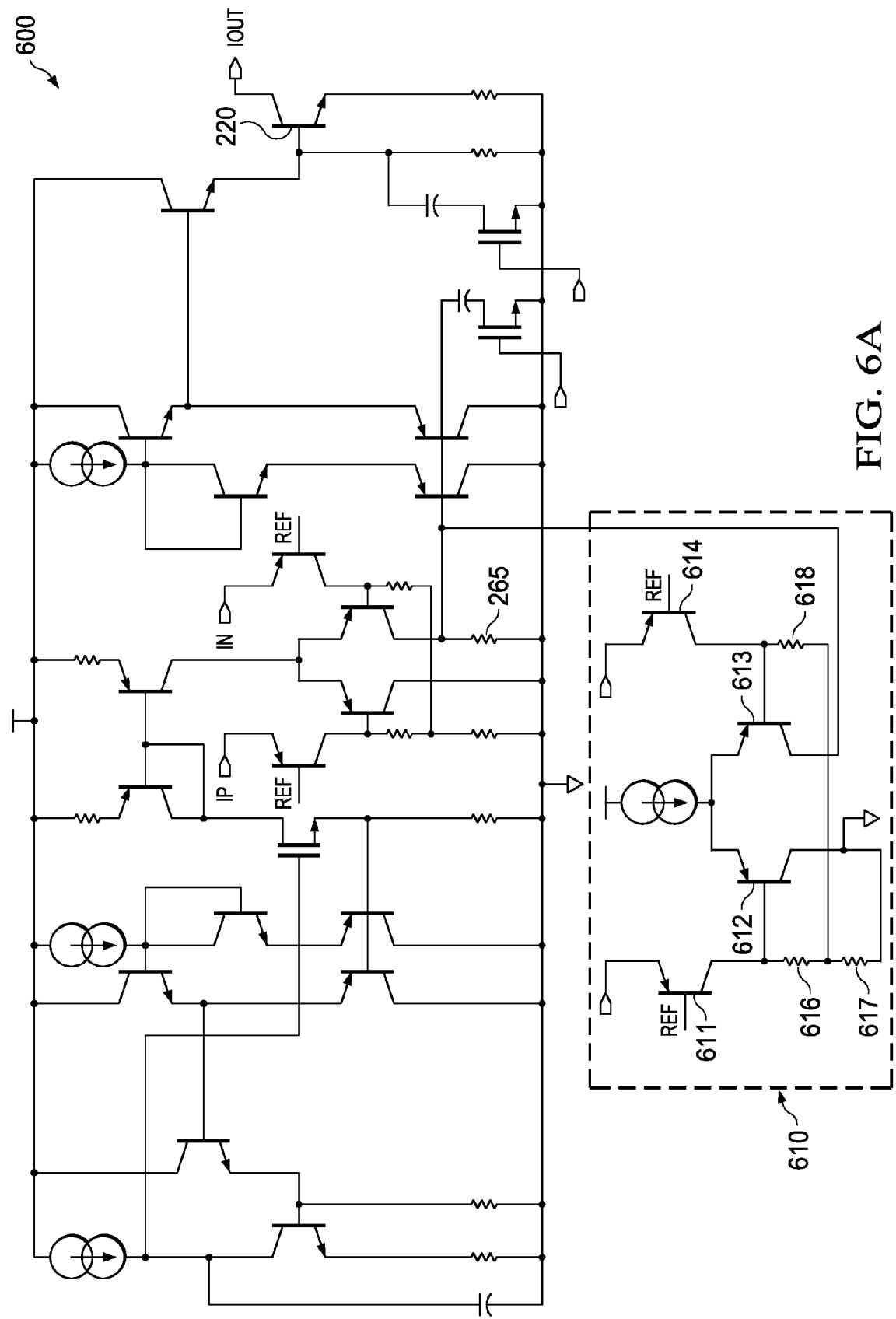
FIG. 6A is a circuit diagram illustrating a laser diode write driver with wave shape control of FIG. 2A for showing overshoot amplitude and pulse width control circuitry.

Returning to the LDWD 165, there is another implementation of wave shape control circuitry that can be used for controlling the overshoot. FIG. 6A is a circuit diagram 600 that includes a device 610 for controlling overshoot. In this implementation, the waveform overshoot can be controlled explicitly by adding a pulsing current source that pulses into the resistor 265 of the write driver channels for a specified duration and amplitude; each channel being independent. This increases the overshoot of a specific channel if desired. The device 610 includes switches, or transistors, 611-614 and resistors 616-618. In this device 610, like the data path, there is a differential pair, which includes transistors 612-613 that can either steer current into the resistor 265 or to ground. The tail current is $I_{OUT}/M$, where M is a scale factor. When the current is pulsed into the resistor 265, it increases the voltage; this increases the voltage on the base of the output transistor 220, which increases the output current. Turning to FIG. 6B, this figure is a comparative graph of the voltage for a data signal 620 and the voltage for an overshoot signal 630 as a function of time. As can be seen from the figure, the overshoot data is only on for a short period of the time the data signal is on, or switching time as shown.

With the LDWD shown in circuit diagram 600, the channel driver can be configured independently of the others, and its switching is independent. The driver has a very large dynamic range and the accuracy depends on the gain factor K and device matching. When properly scaled, the driver has very low power and provides very fast switching of the data. In addition, adjusting one of the wave-shape controls has very little impact on the other controls. The wave-shapes can be modified in several ways including rise-time, fall-time and overshoot to make a waveform that gives the best performance. Also, each of the controls is easily programmable with a minimal amount of additional circuitry. Finally, this wave shape control can be done in either the LDWD 165 or the LDRD 167.

Figure 7A:
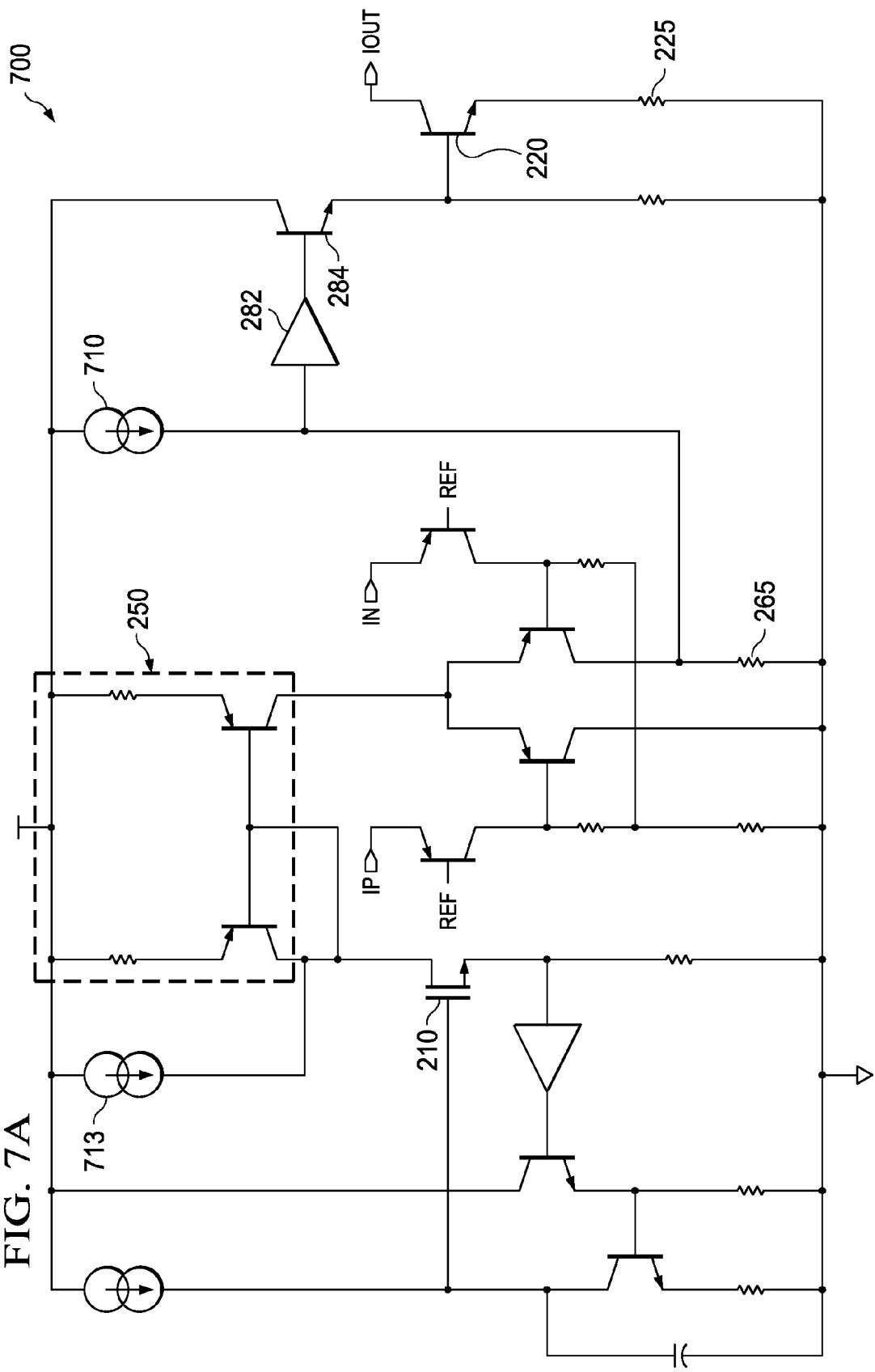
FIGS. 7A-7B are circuit diagrams illustrating alternative implementation of the laser diode write driver of FIG. 2A with two current sources.
Figure 7B:
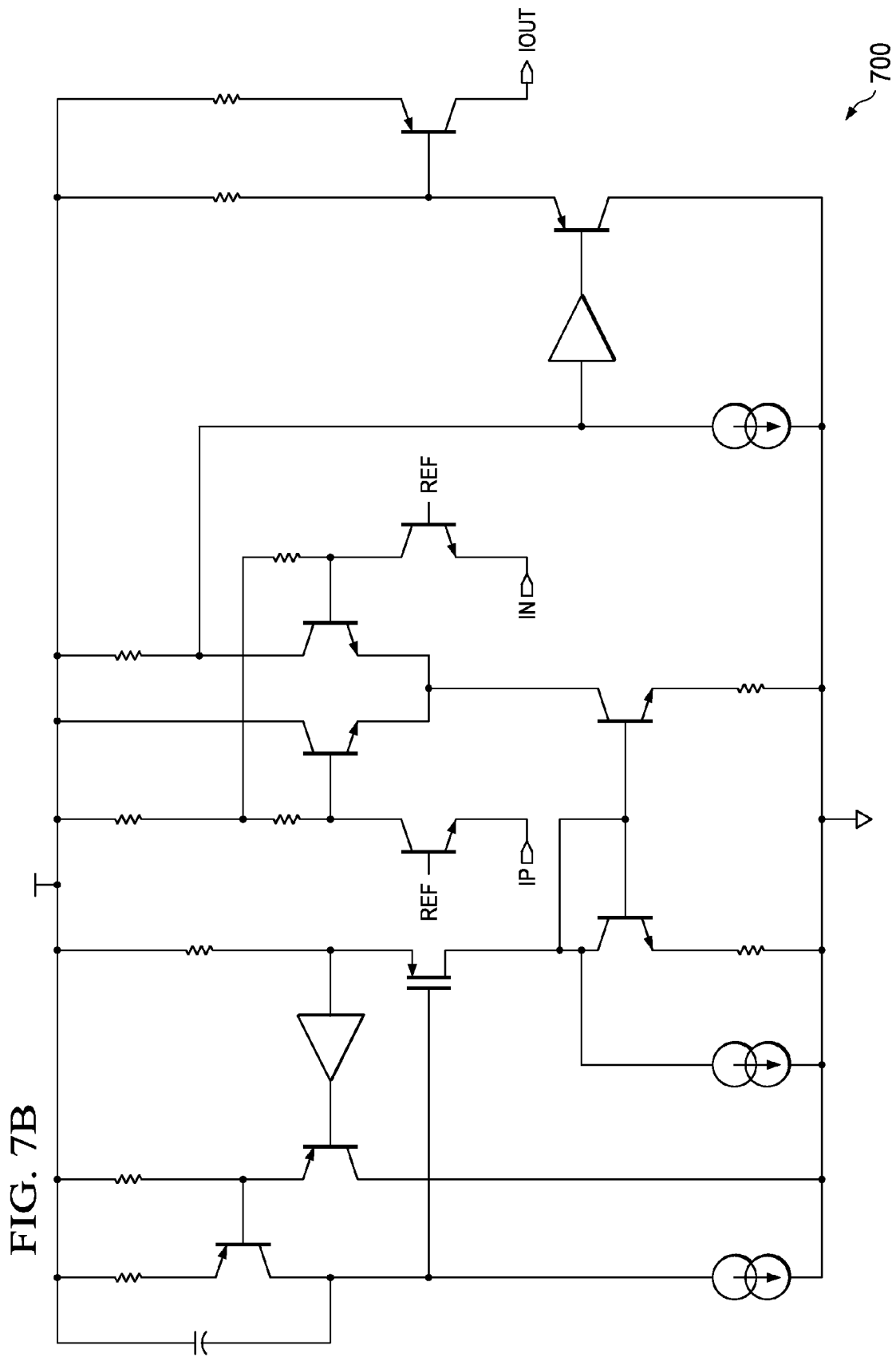

FIG. 7A is a circuit diagram 700 illustrating alternative implementations of the circuit diagram 200 with two additional current sources. This alternate circuit architecture is used for faster switching of the output current at the expense of power. This circuit diagram 700 includes a current source 710 and a current source 713. The voltage at resistor 265 as described earlier is at ground when the output current is off and is at some voltage which is roughly equal to the output transistor base-emitter voltage and the output current through resistor 225. In this implementation, a current source 710 has been added to the resistor 265. The current source 710 is set to a certain value so that it sets a voltage across the resistor 265 that is not enough to turn on the output device 220, but is as far from ground as it can be without turning on the output device. Typical values may be approximately 500 mV. This current has multiple effects. First, without any other current sources, this current could cause an error in the output device current by adding to the voltage drop across the resistor 265 which sets the output current. This can be remedied by adding current source 713 to the drain of MOS device 210. This current reduces the amount of current going through mirror 250. It is reduced by the exact amount of current that is added to resistor 265 or that amount which flows from the current source 710. The current from current source 250 either flows to ground or into the resistor 265 as described earlier. When it goes to the resistor 265, it is added to the current 710, which is the amount it was reduced by earlier. In this way, the amount of the voltage drop across resistor 265 stays approximately the same when the output device 220 is fully on, just as if these two current sources were never added to the circuit. However, when the output device 220 is in the off condition, the voltage across the resistor 265 is not at ground anymore. So the resistor 265 generally does not change from ground to some value like approximately 1V. Instead, it changes from approximately 500 mV to approximately 1V. Because the voltage change is less and the transistor 284 is already turned on, the output transistor 220 switches faster. This does require extra power to be consumed while the output is shut off. If there is a gain in current mirror 250, then current sources 710, 713 can be scaled appropriately. FIG. 7B is a PNP version of the circuit in which everything is essentially "flipped".

While various embodiments of the laser diode write driver have been described, it may be apparent to those of ordinary skill in the art that many more embodiments and implementations are possible that are within the scope of this system. Although certain aspects of the laser diode driver with waveshape control may be described in relation to specific techniques or structures, the teachings and principles of the present system are not limited solely to such examples. All such modifications are intended to be included within the scope of this disclosure and the present laser write diode driver and protected by the following claim(s).

What is claimed:

1. A laser diode write driver for driving a light source, comprising:
   a feedback loop coupled for receiving an input current signal, the feedback loop operative for reaching a steady state and comprising a first Class AB driver in series with a first Class A driver, wherein the feedback loop transmits a first current signal;
   a current mirror adapted to receive the first current signal, the current mirror operative for replicating the first current signal and transmitting a second current signal;
   a differential device adapted to receive the second current signal, the differential device operative for steering current in at least one direction and transmitting a first voltage signal;
   a second class AB driver adapted to receive the first voltage signal and transmit a first drive signal,
   a second Class A driver adapted to receive the first drive signal and transmit a second drive signal;
   an output device coupled to the second drive signal and operative for transmitting a driver output signal that drives the light source in response to receiving the second drive signal.

2. The laser diode write driver of claim 1, wherein the feedback loop is operative for reaching a steady state where at least one device within the feedback loop receives all of current associated with transmitting the first current signal.

3. The laser diode write driver of claim 1, wherein the first Class A driver is designed to match the second Class A driver.

4. The laser diode write driver of claim 1, wherein the first Class AB driver is designed to match the second Class AB driver.

5. The laser diode write driver of claim 1, wherein the Class AB drivers are independently programmable from the Class A drivers.

6. A laser diode write driver for driving a light source, comprising:
   a feedback loop coupled for receiving an input current signal, the feedback loop operative for reaching a steady state and comprising a first Class AB driver in series with a first Class A driver, wherein the feedback loop transmits a first current signal;
   a current mirror adapted to receive the first current signal, the current mirror operative for replicating the first current signal and transmitting a second current signal;
   a first current source coupled between a first supply voltage and an input of the current mirror;
   a second current source coupled between the first supply voltage and an an input of a second Class AB driver;
   a differential device adapted to receive the second current signal, the differential device operative for steering current in at least one direction and transmitting a first voltage signal;
   a second class AB driver adapted to receive the first voltage signal and transmit a first drive signal,
   a second Class A driver adapted to receive the first drive signal and transmit a second drive signal;
   an output device coupled to the second drive signal and operative for transmitting a driver output signal that drives the light source in response to receiving the second drive signal.

7. The laser diode write driver of claim 6, wherein the feedback loop is operative for reaching a steady state where at least one device within the feedback loop receives all of current associated with transmitting the first current signal.

8. The laser diode write driver of claim 6, wherein the Class AB drivers are independently programmable from the Class A drivers.

9. An optical disk drive system associated with a laser diode, the optical disk drive system comprising:
   a current generator for receiving input signals;
   a current switch coupled to receive timing signals; and
   a current driver coupled to a feedback loop coupled for receiving an input current signal, the feedback loop operative for reaching a steady state and comprising a Class AB driver in series with a Class A driver, wherein the feedback loop transmits a first current signal; a current mirror adapted to receive the first current signal, the current mirror operative for replicating the first current signal and transmitting a second current signal; a differential device adapted to receive the second current signal, the differential device operative for steering current in at least one direction and transmitting a first voltage signal; a second class AB driver adapted to receive the first voltage signal and transmit a first drive signal, a second Class A driver adapted to receive the first drive signal and transmit a second drive signal; an output device coupled to the second drive signal and operative for transmitting a driver output signal that drives the light source in response to receiving the second drive signal.

10. The laser diode write driver of claim 9, wherein the laser diode write driver is operative for driving a bi-polar device.

11. The laser diode write driver of claim 9, wherein the laser diode write driver further comprises first and second current sources.

12. The laser diode write driver of claim 9, wherein the Class AB drivers are independently programmable from the Class A drivers.

* * * * *